United States Patent [19]

Tsuchida

[11] Patent Number: 5,534,042
[45] Date of Patent: Jul. 9, 1996

[54] METHOD AND APPARATUS FOR COMPOSTING ORGANIC MATTERS HAVING HIGH WATER CONTENT

[75] Inventor: Yuji Tsuchida, Tokyo, Japan

[73] Assignee: Kabushiki Kaisha Environmental Engineering Laboratory, Tokyo, Japan

[21] Appl. No.: 269,095

[22] Filed: Jun. 30, 1994

[30] Foreign Application Priority Data

Apr. 4, 1994 [JP] Japan .................................... 6-065931

[51] Int. Cl.⁶ ............................................................ C05F 9/04
[52] U.S. Cl. ................................................................ 71/9
[58] Field of Search ...................................................... 71/9

[56] References Cited

U.S. PATENT DOCUMENTS

| | | | |
|---|---|---|---|
| 3,246,954 | 4/1966 | Redman | 71/9 X |
| 4,374,804 | 2/1983 | Easter, II | 71/9 X |
| 5,354,349 | 10/1994 | Inoue | 71/9 |

FOREIGN PATENT DOCUMENTS

| | | | |
|---|---|---|---|
| 2500459 | 7/1976 | Germany | 71/9 |
| 2723581 | 9/1978 | Germany | 71/9 |
| 1097181 | 5/1986 | Japan | 71/9 |

*Primary Examiner*—Ferris Lander
*Attorney, Agent, or Firm*—Cushman Darby & Cushman

[57] ABSTRACT

This invention relates to a method and apparatus for forming a compost product from organic matter having high water content: the method involving (1) holding organic matter with a large amount of water in a treatment tank for one to three hours while providing a supply of air, heating to not more than 60° C. and agitating and grinding the organic matter so that the matter is reduced to a rice porridge state and aerobic fermentation occurs, extracting generated gas and water vapor to the outside of the tank, thereby dehydrating and drying the organic matter to form a fermentation and decomposition product having a water content of not more than 65%, (2) holding the fermentation and decomposition product for one to six hours at a temperature between 60° C. and 100° C. to thermally decompose the fermentation and decomposition product, extracting generated gas and water vapor to the outside of the tank, thereby dehydrating and drying the fermentation and decomposition product to form a thermal decomposition product having a water content of not more than 45%, and (3) drying the thermal decomposition product for one to six hours at a temperature between 100° C. and 135° C. to sterilize the thermal decomposition product, extracting generated gas and water vapor to the outside of the tank, thereby dehydrating and drying the thermal decomposition product to form the compost product having a water content of not more than 30%; and an apparatus capable of accomplishing the above method.

2 Claims, 1 Drawing Sheet

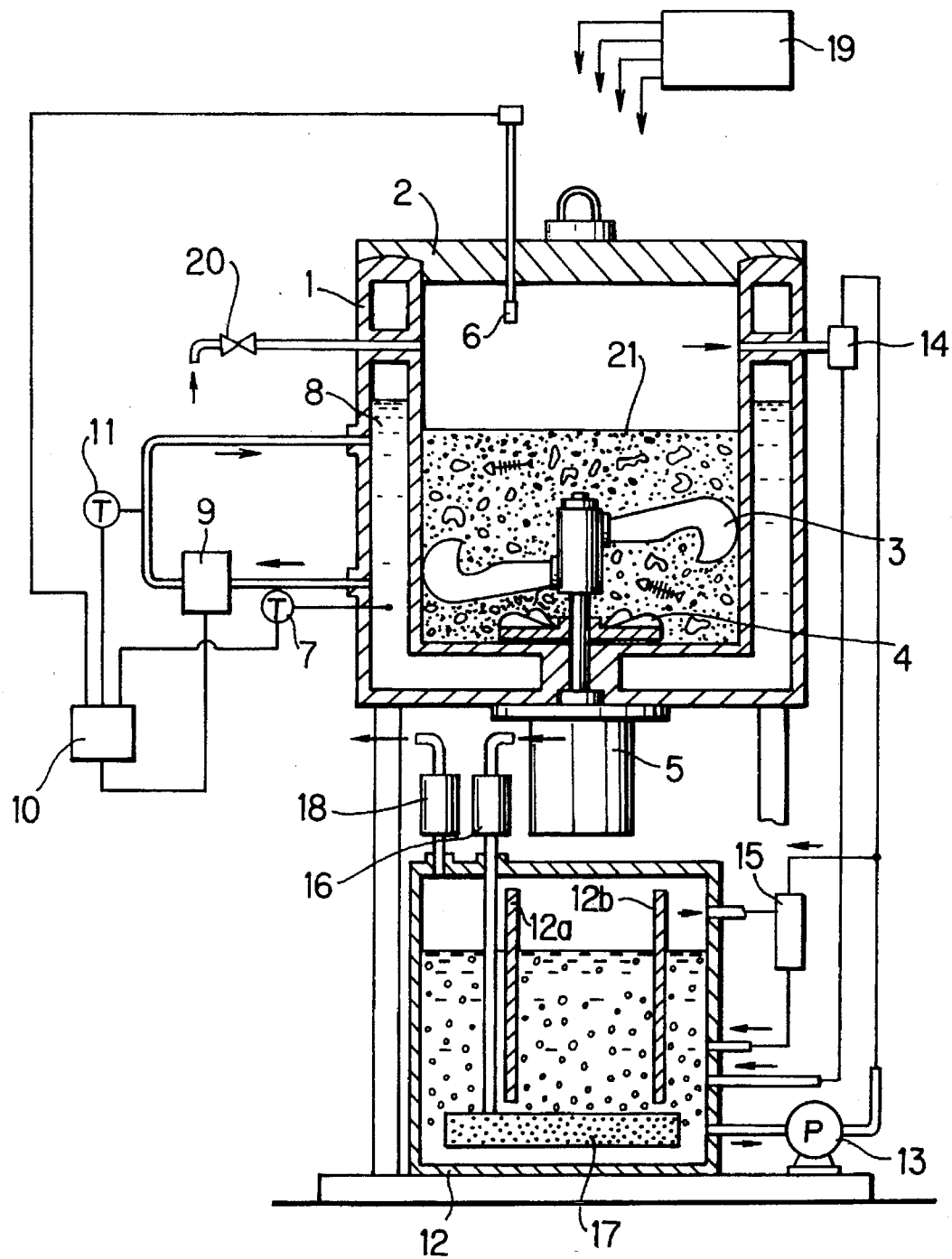

METHOD AND APPARATUS FOR COMPOSTING ORGANIC MATTERS HAVING HIGH WATER CONTENT

BACKGROUND OF THE INVENTION

1. Field of the Invention

The present invention relates to a method and an apparatus for drying, decomposing and composting organic matters containing a large amount of water such as garbage, sludge and the like.

2. Background Art

It is desirable that organic waste containing water such as garbage and the like is utilized as a soil improving agent after decomposing, drying and composting it at a place of its generation, and reducing its volume and weight.

Especially it is recently desired to make utilization after composting as far as possible without depending on a self-governing community or the like upon treatment of garbage generated from food processing factories, cookhouses of restaurants, kitchens of homes and the like.

However, in the case of conventionally known composters for domestic use, troubles occurred in the fermentation treatment when waste to be treated has mixed with those which cannot be composted easily such as wooden waste such as toothpicks, disposable wooden chopsticks and the like, metal waste such as aluminum foils and the like, disposable table ware made of plastic, waste such as small bags, films and the like, shells, egg shells, bones and the like, so that it is necessary to remove them beforehand, and it takes a long time to ferment organic matters, as well as organic matters such as garbage containing a large amount of water of not less than 80% and around 95% in weight ratio can not be fermented conveniently as they were. Therefore, when they are to be composted, in order to adjust their water-containing amounts to be around 65%, it has been necessary to mix not less than 40% of water content adjusting materials such as dried soil, dried grass, straw, rice bran, sheets of newspaper, sawdust and the like so as to provide a state in which the surface was dry, after which fermentation microorganisms are added.

However, such preselection of waste is difficult to be performed, and especially recently it has become impossible to obtain the water content adjusting materials as described above. In addition, such mixing of the water content adjusting materials results in increase of the weight of garbage which should have been principally reduced in weight as far as possible. Such increase of the weight cannot avoid criticism of mistaking the means for the purpose as for a treating method of garbage for general homes and businesses, apart from a case of production of a large amount of composts.

In addition, fermentation is slow in such water content adjusting materials, and it takes several years to make composts, so that when they are used in a paddy field and the like the problems that, they float and are lost in flow and plug water passages.

Further, in the case of those of a type of natural fermentation utilizing fermentation microorganisms, there are problems that in addition to the treatment requiring a long time period, temperature management and changeover are difficult, and treatment of fishery products which generate strong offensive odors is especially difficult in urban places.

Furthermore, a rotary kiln of a hot wind drying type, which is used in Europe and the like, is not suitable for Japanese garbage having a high water content, besides which is necessary to mix a large amount of water content adjusting material as described above, treatment of leftover food and the like is difficult, and further because it is a hot wind drying type, there are problems that there is much loss of heat and heat efficiency is low, and further there is such a drawback that animal waste such as fishery products and the like generates strong offensive odor during the treatment.

SUMMARY OF THE INVENTION

The present invention has been made in order to solve the aforementioned problems, an object of which is to provide a method and an apparatus capable of making a compost in such a manner that; garbage having a high water content of not less than 80% and somewhat mixed with bones, shells, disposable wooden chopsticks, disposable lunch boxes and the like which can not be fermented can be efficiently dried, an offensive odor generated at that time is completely treated, aerobic bacteria adhering to the waste are activated to perform fermentation efficiently, and drying, decomposition and sterilization of garbage can be completed within a short time period of about 12 hours.

Thus, foreign matters difficult for fermentation as described above become brittle, and are finely ground dried and contracted during treatment steps in accordance with the method of the present invention.

The aforementioned object can be achieved by composting organic matters having a high water content by means of a treatment method comprising:

a fermentation and decomposition step in which organic matters containing a large amount of water is held in a treatment tank under supply of air for not less than one hour and not more than three hours at a temperature from ordinary temperature to not more than 60° C. while heating, agitating and grinding them to make them into a rice porridge state and to have them perform an aerobic fermentation, and generated gas and water vapor are extracted to the outside of the treatment tank to perform dehydration and drying thereof into a water content of not more than 65%;

a thermal decomposition step in which the temperature of a fermentation and decomposition product is held for not less than one hour and not more than six hours at not less than 60° C. and not more than 100° C. to thermally decompose the fermentation and decomposition product, and generated gas and water vapor are extracted to the outside of the treatment tank to perform dehydration and drying thereof into a water content of not more than 45%; and a final drying step in which a temperature of a thermal decomposition product is held for not less than one hour and not more than six hours at not less than 100° C. and not more than 135° C. to perform sterilization, and generated gas and water vapor are extracted to the outside of the treatment tank to perform dehydration and drying thereof into a water content of not more than 30%.

During this treatment time period, the temperature of the material to be treated is automatically controlled in accordance with the drying speed and the water content.

Then, when a raw material containing heavy metal components is treated by this treatment method, it is recommended that the organic matters to be treated are added with caustic lime of not less than 8% and not more than 12% in weight % with respect to the dry weight and are subjected to an agitation treatment at a temperature not less than 70° C. and not more than 90° C. for not less than 15 minutes and within one hour, then a known sulfide is added to perform a stabilization treatment of heavy metal, beforehand.

Further, the aforementioned composting treatment method can be conducted by a composting apparatus comprising:

- a treatment tank having a heat medium jacket provided to cover a main body portion, an introduction port for organic matters to be treated, a lid capable of closing the introduction port for organic matters in air-tight manner, a compost takeout port, a door capable of closing the compost takeout port in air-tight manner, a ventilation tube provided with a ventilation control valve and capable of introducing air into the inside of the treatment tank and an exhaust tube capable of extracting internal gas to the outside;
- a unit for circulating a heat medium in the heat medium jacket of the treatment tank while sequentially controlling it in a temperature range not less than ordinary temperature and not more than 135° C. in accordance with a proceeding degree of drying of contents in the treatment tank;
- a rotary vain rotating in the treatment tank, grinding and agitating organic matters to be treated in the treatment tank, and capable of making the organic matters into a rice porridge state;
- a unit for rotating the rotary vain;
- units for extracting the gas generated in the treatment tank through its exhaust tube to the outside of the treatment tank and performing a deodorization treatment to release it to atmospheric air; and
- a unit for controlling the operation of each of aforementioned composing elements.

In the case of the construction as described above, the matter to be dried is efficiently agitated, fermented, dehydrated and dried at a heating temperature at which no protein is decomposed, so that a compost having a good quality is obtained.

BRIEF DESCRIPTION OF A DRAWING

FIG. 1 is an explanatory view showing one embodiment of a composter according to the present invention.

DESCRIPTION OF THE PREFERRED EMBODIMENT

The gist of the present invention is to provide a method and an apparatus which can perform drying, weight reduction and can compost garbages having a high water content such as, for example, vegetable waste having a water content of 90–98% in weight, leftover food having the same of 85–95% and the like without using any water content adjusting material for a short time period.

Thus, in the fermentation and decomposition step as the first step, organic matters containing a large amount of water are placed in the treatment tank provided with the rotary vane, which are heated to a temperature from an ordinary temperature to not more than 60° C. under supply of air while vigorously agitating and grinding them to make them into a rice porridge state and to have them perform aerobic fermentation, and generated gas and water vapor are extracted to the outside of the treatment tank to perform drying and dehydration.

The fermentation and decomposition step is continued until the water content becomes not more than 65% depending on the amount of raw materials. The required time depends on the amount of raw materials to be treated, however, it is usually about one hour to three hours.

For this treatment step, the heat medium heated to a temperature of about 80° C. to 135° C. is circulated in the jacket of the treatment tank beforehand, a predetermined amount of raw material organic matters are introduced into the treatment tank, the rotary vane in the treatment tank is rotated, and the organic matters become a rice porridge state by vigorously agitating and grinding them.

Though the temperature of the heat medium is greatly decreased, it is heated so as to be about 60° C. after a predetermined time period, and have it circulate in the jacket. The temperature of the heat medium depends on season and the water content of raw materials to be treated, however, it can be experimentally determined.

During this period, generated gas and water vapor are extracted while supplying air into the treatment tank, extracted exhaust gas is guided to an absorbing tank filled with water, and released to outside air after absorbing the gas with offensive odor by washing it.

The water having absorbed various gases is supplied with ozone, chlorine and the like to decompose and clean its organic components, and they are reutilized or released to sewage.

While the temperature of organic matters rises from ordinary temperature to 60° C., the fermentation is performed by aerobic bacteria, and simultaneously the dehydration and drying by removal of water vapor proceed.

When the water content approaches 65%, the contents in the treatment tank gradually escapes from the rice porridge state and is solidified, which begins to become a solid state or a granular state.

If neccessary, from about the time at which the water content becomes not more than 65%, the temperature of the heat medium may be optionally increased, the temperature of a fermented and decomposed product in the treatment tank is held at not less than 60° C. and not more than 100° C. to thermally decompose the fermented and decomposed product, generated gas and water vapor are extracted to the outside of the treatment tank to proceed dehydration and drying, and the water content is lowered to about not more than 45%.

In a preferred embodiment, by taking the time of not less than one hour and not more than six hours, the temperature in the treatment tank is raised successively from 60° C. up to 100° C.

In this step, the grinding and agitation by the rotatry vane, and the extraction, decomposition and deodorization treatment of generated gas are subsequently continued.

In addition, in this step, general bacteria and fungi die, and in turn the the propagation of thermophilic cellulose decomposing bacteria begins, the secondary fermentation is performed by them, and the plant fibers are decomposed. Further, the thermal decomposition is performed at the other hand.

Next, as the final step, in order to dehydrate and dry the thermally decomposed product by the aforementioned step into a water content of not more than 30%, its temperature is held for not less than one hour and not more than six hours in not less than 100° C. and not more than 135° C. to perform sterilization, and generated gas and water vapor are extracted to the outside of the treatment tank.

Thus, during the drying step, it is desirable that the pressure in the treatment tank is reduced, and the emission of vapor is facilitated.

In this step, the reason why the matter to be treated is not heated to more than 135° C. is to prevent the protein from denaturing. On the other hand, if the heating temperature is not more than 100° C., a long time period is required for drying, which is uneconomical.

Thus, in this step, harmful insects and pathogenic organisms in the garbage die, so that a clean compost can be obtained.

Incidentally, when the organic matters to be treated are only ones containing a large amount of oil content such as, for example, bony parts of fishery products and the like, it is necessary to boil them beforehand to remove the oil content. However, even in the case of such garbage of high oils and fats, when leftover food and vegetable containing no oil content are mixed by not less than the equivalent amount, the degreasing treatment is unnecessary.

In addition, it is desirable that thick bones of animals, wooden waste materials, bulky waste and the like are ground into suitable sizes beforehand.

The compost obtained by such treatment has a nature as shown in Table 1.

However, in Table 1:
fishery products are fishery products having low fats and oils;
leftover food A includes only rice food; and
leftover food B includes 60% of leftover food and vegetable containing no oil content)+(40% of fishery products containing oil content).

TABLE 1

Cross-reference between Material and Nature of Compost

| Material | Nature of Compost |
| --- | --- |
| Leaf vegetable | dried pale brown soil |
| Fishery products tickness | fine black brown granule slightly having slight adhesion |
| Leftover food A | soil-colored granules mixture from lump of size of about golf ball to powder state |
| Leftover food B | dried and soil-colored fine powder |
| Carbohydrate | arid soil powder |

In addition, the water vapor generated in the treatment tank contains more or less offensive odor components, so that a deodorization treatment thereof is necessary.

Thus, the construction is made such that the water vapor containing the odor generated in the treatment tank is sucked to the outside by means of a suitable unit to recovery as water it by washing it, and nave the odor component absorb by water, only odorless components are released to the outside, and polluted water is subjected to an aeration treatment to reutilize.

Incidentally, the odors of onion and garlic are difficult to treat by means of the method of vapor, so that it is recommended that they are treated by an ozone decomposition method and the like and released to atmospheric air.

Details of the present invention will be explained with reference to the drawing.

FIG. 1 is an explanatory view showing one embodiment of a composter according to the present invention.

In the figure, 1 is a garbage treatment tank provided with a heat medium jacket, 2 is a lid thereof, 3 is a rotary vane, 4 is a pulsator, 5 is a motor, 6 is a humidity meter, 7 is a temperature detector, 8 is a heat medium, 9 is a heat pump, 10 is a controller of the heat pump, 11 is a temperature detector for the heat medium, 12 is a water reserving tank, 13 is a water circulating pump, 14 is an exhaust ejector for the treatment tank, 15 is an ejector for circulating the gas in the water reserving tank, 16 is an air pump for aeration, 17 is an air stone (porous pipe) for aeration, 18 is a deodorizing unit, 19 is a control panel, 20 is a ventilation control valve, and 21 is a garbage to be treated.

The garbage treatment tank 1 is a cylindrical vessel provided with the jacket for accommodating and circulating the heat medium 8 such as oil or the like, which has a ventilation tube and an exhaust tube communicating with the outside air, and is closed by the lid 2 air-tightly. Further, although not shown in the figure, it has a takeout port for a treated compost at a lower portion of its body portion and a door for closing it air-tightly manner, and the rotary vane 3 and the pulsator 4 are provided at the interior thereof rotatably about a central axis.

As for the heat medium 8 its temperature is adapted to be controled sequentially by means of the heat pump 9 and its controller 10 in accordance with a predetermined program depending on the water content, temperature and the like of the contents in the garbage treatment tank 1, and the heat medium is circulated in the jacket 1a of the garbage treatment tank 1 by a circulating pump built-in the heat pump 9, so that the garbage 21 is heated by the heat medium 8.

The pulsator 4 in the garbage treatment tank 1 is provided coming into contact with the bottom surface of the tank, the rotary vane 3 is provided above it coaxially with the pulsator 4, and any one of which can be rotated by the motor 5.

It is desirable to constitute the pulsater so that the pulsator 4 splashes the garbage 21 from the center of the treatment tank 1 toward the outside, and the rotary vane 3 grinds the splashed garbage 21 and clips off it from an inner wall surface of the garbage treatment tank 1 and it can be put back to the central axis direction.

In addition, although the rotary vane 3 and the pulsator 4 are driven by one common shaft in the figure, it is also recommended that, for example, a duplex tube shaft or the like may be used to drive them independently with each other.

Anyway, by using the rotary vane 3 and the pulsator 4, the garbage 21 having a high water content is ground, heated and made into a rice porridge state.

The heat pump 9 and the heat pump controller 10 have the heat medium 8 in the heat medium jacket of the treatment tank 1 circulate while performing sequence control within a temperature range of not less than 40° C. and not more than 135° C. in accordance with a degree of proceeding of drying of the contents in the treatment tank.

The heat medium 8 is heated to a predetermined temperature of not less than 70° C. and not more than 135° C., desirably about 75° C. to 80° C., thereby the garbage 21 is also slowly heated from ordinary temperature to 65° C., evaporation of water content is performed, and the temperature is raised exceeding 65° C.

When the water content of the contents in the treatment tank 1 is lowered, provided that the temperature difference with respect to the heat medium is constant, the temperature rising speed of the contents gradually becomes fast.

Incidentally, during this step, it is recommended that the ventilation control valve 20 is narrowed down, by having the exhaust ejector 14 for the treatment tank described below operate to lower the internal pressure in the treatment tank 1, so as to facilitate evaporation of water content.

Because the generated vapor has a considerable offensive odor, the deodorization thereof is necessary.

Thus, the water reserving tank 12 is provided, water in the water reserving tank 12 is supplied to the ejector 14 by the water circulating pump 13, the vapor at an upper portion in the garbage treatment tank 1 is sucked to be guided to the inside of the water reserving tank 12 and absorbed by water, then outside air is sucked by the air pump 16 and supplied to the air stone 17 provided at a lower portion in the water reserving tank 12, and the aeration is performed to decompose offensive odor components absorbed in water by means of aerobic bacteria.

Incidentally, buffers 12a, 12b are provided in the water reserving tank 12.

Further, a part of gas at an upper portion in the water reserving tank 12 is sucked by the ejector 15 for circulating the gas in the water reserving tank, which is returned into water in the water reserving tank 12 again, however, excessive gas is released to atmospheric air through the deodorizing unit 18 filled with an absorbing agent.

When dehydration and drying of the contents in the garbage treatment tank 1 proceed, and the water content lowers to a predetermined value, desirably about 30–10%, then the composting is completed.

Thus, according to the present invention, the composting completes in about 3 hours in the case of the apparatus having the throughput of 2.5 kg using for garbage treatment for homes, about 6 hours in the case of the one of 100 kg, and about 12 hours in the case of the one of 2500 kg in large size.

The compositions of composts produced by the method of the present invention using various raw materials are shown in Table 2. According to this table, it is known that the composts produced by the method of the present invention have excellent compositions as soil improving agents.

TABLE 2

| Item Raw material | Composition (total amount %) | | | | |
|---|---|---|---|---|---|
| | Nitrogen | Phosphorus | Potassium | Lime | Magnesia |
| Fish bony parts | 6.85 | 2.39 | 1.12 | 1.95 | 0.39 |
| Leftover food | 2.65 | 1.45 | 0.29 | 0.21 | 0.48 |
| Bean curd lees | 4.21 | 0.75 | 0.59 | 0.27 | 0.25 |
| Sludge | 3.12 | 1.75 | 0.47 | 0.25 | 0.45 |

The present invention is constituted as described above, therefore, according to the present invention, it is possible to efficiently dehydrate, ferment, dry and compost garbage and the like having a high water content.

What is claimed is:

1. A method for forming a compost product from organic matter having a high water content, comprising the steps of:

(1) holding organic matter containing a large amount of water in a treatment tank for not less than one hour and not more than three hours, while providing a supply of air, heating from ordinary temperature to not more than 60° C. and agitating and grinding the organic matter, so that the organic matter is reduced to a rice porridge state and aerobic fermentation occurs, and extracting generated gas and water vapor to the outside of the treatment tank, thereby dehydrating and drying the organic matter to form a fermentation and decomposition product having a water content of not more than 65%;

(2) holding the fermentation and decomposition product for not less than one hour and not more than six hours at a temperature of not less than 60° C. and not more than 100° C. to thermally decompose the fermentation and decomposition product, and extracting generated gas and water vapor to the outside of the treatment tank, thereby dehydrating and drying the fermentation and decomposition product to form a thermal decomposition product having a water content of not more than 45%; and (3) drying the thermal decomposition product for not less than one hour and not more than six hours at a temperature of not less than 100° C. and not more than 135° C. to sterilize the thermal decomposition product, and extracting generated gas and water vapor to the outside of the treatment tank, thereby dehydrating and drying the thermal decomposition product to form the compost product having a water content of not more than 30%.

2. A method for forming a compost product from organic matter having a high water content according to claim 4, wherein the organic matter to be treated has an initial water content of not less than 80% and not more than 98%.

* * * * *